United States Patent
Kong et al.

(10) Patent No.: US 7,412,109 B2
(45) Date of Patent: Aug. 12, 2008

(54) SYSTEM AND METHOD FOR FILTERING ARTIFACTS IN IMAGES

(75) Inventors: Hao-Song Kong, Newton, MA (US); Yao Nie, Newark, DE (US); Anthony Vetro, Cambridge, MA (US); Huifang Sun, Billerica, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 515 days.

(21) Appl. No.: 10/965,325

(22) Filed: Oct. 14, 2004

(65) Prior Publication Data

US 2005/0100237 A1    May 12, 2005

Related U.S. Application Data

(63) Continuation-in-part of application No. 10/703,809, filed on Nov. 7, 2003, now abandoned.

(51) Int. Cl.
G06K 9/40 (2006.01)
G06K 9/46 (2006.01)
G06K 9/56 (2006.01)

(52) U.S. Cl. ............... 382/261; 382/233; 382/268; 382/275; 382/205

(58) Field of Classification Search ......... 382/260, 382/261, 233, 266, 268, 275, 205, 279
See application file for complete search history.

(56) References Cited

U.S. PATENT DOCUMENTS

| | | | | |
|---|---|---|---|---|
| 5,757,977 A * | 5/1998 | Mancuso et al. | ............ | 382/260 |
| 5,920,356 A * | 7/1999 | Gupta et al. | ............ | 348/606 |
| 6,101,276 A * | 8/2000 | Adiletta et al. | ............ | 382/236 |
| 6,167,157 A | 12/2000 | Sugahara | ............ | 382/236 |
| 6,178,205 B1 | 1/2001 | Cheung et al. | ............ | 375/240.29 |
| 6,259,823 B1 * | 7/2001 | Lee et al. | ............ | 382/268 |
| 6,320,905 B1 * | 11/2001 | Konstantinides | ............ | 375/240.08 |
| 6,332,136 B1 | 12/2001 | Di Giura et al. | ............ | 706/1 |
| 6,496,605 B1 | 12/2002 | Osa | ............ | 382/268 |
| 6,539,060 B1 | 3/2003 | Lee et al. | ............ | 375/240.29 |
| 2003/0081854 A1 * | 5/2003 | Deshpande | ............ | 382/261 |
| 2005/0100241 A1 * | 5/2005 | Kong et al. | ............ | 382/268 |

FOREIGN PATENT DOCUMENTS

JP    2005166021 A    *  6/2005

OTHER PUBLICATIONS

Barner, K.-"Coding artifact reduction using edge map guided adaptive and fuzzy filter"—IEEE, Jun. 2004, pp. 1135-1138.*

(Continued)

*Primary Examiner*—Jingge Wu
*Assistant Examiner*—Bernard Krasnic
(74) *Attorney, Agent, or Firm*—Dirk Brinkman; Clifton D. Mueller; Gene V. Vinokur

(57) ABSTRACT

A method filters pixels in an image, by first partitioning the image into blocks. Edge block are identified. A variance of an intensity for each pixel in each edge block is determined. Then, each pixel in each edge block is filtered with a filter that is dependant on the variance of the pixel.

5 Claims, 15 Drawing Sheets

OTHER PUBLICATIONS

Wu, C-B.-"Adaptive postprocessors with DCT-Based block classifications"—IEEE, vol. 13, No. 5, May 2003, pp. 365-375.*

Kim, S.-"A deblocking filter with two separate modes in block-based video coding"—IEEE, vol. 9, No. 1, Feb. 1999, pp. 156-160.*

Lu, L.-"Full-Reference video quality assessment considering structural distortion and no-reference quality evalutation of MPEG video"—IEEE, 2002, pp. 61-64.*

Wei, A.-"Fuzzy ordering theory and its use in filter generalization"—EURASIP Journal on Applied Signal Processing 2001, pp. 206-218.*

Fargas, A.-"On empirical estimation of the parameters of edge enhancement filters"—1992—IEEE—pp. 346-350.*

Lang, et al., "*Noise reduction using an undecimated discrete wavelet transform,*" Signal Processing Newsletters, vol. 13, Jan. 1996.

* cited by examiner

SYSTEM AND METHOD FOR FILTERING ARTIFACTS IN IMAGES

RELATED APPLICATION

This application is a Continuation-in-Part application of U.S. patent application, Ser. No. 10/703,809, "System and Method for Classifying and Filtering Pixels," filed by Kong et al., on Nov. 7, 2003 now abandoned.

FIELD OF THE INVENTION

The invention relates generally to digital signal processing, and more particularly to classifying pixels in images and filtering the pixels according to the classifications.

BACKGROUND OF THE INVENTION

Compression is used in many imaging applications, including digital cameras, broadcast TV and DVDs, to increase the number of images that can be stored in a memory or to reduce the transmission bandwidth. If the compression ratio is high, then visible artifacts can result in the decompressed images due to quantization and coefficient truncation side effects. A practical solution filters the decompressed image to suppress the visible artifacts and to guarantee a subjective quality of the decompressed images.

Most video coding standards such as ITU-T H.26× and MPEG-1/2/4 use a block-based process. At high compression ratios, a number of artifacts are visible due to the underlying block-based processing. The most common artifacts are blocking and ringing.

The blocking artifacts appear as grid noise along block boundaries in monotone areas of a decompressed image. Blocking artifacts occur because adjacent blocks are processed independently so that pixels intensities at block boundaries do not line up perfectly after decompression. The ringing artifacts are more pronounced along edges of the decompressed image. This effect, known as Gibb's phenomenon, is caused by truncation of high-frequency coefficients due to quantization AC coefficients.

Many post-processing techniques are known for removing these coding artifacts.

Spatial domain methods are described in U.S. Pat. No. 6,539,060, "Image data post-processing method for reducing quantization effect, apparatus therefor," issued to Lee et al. on Mar. 25, 2003, U.S. Pat. No. 6,496,605, "Block deformation removing filter, image processing apparatus using the same, method of filtering image signal, and storage medium for storing software therefor," issued to Osa on Dec. 17, 2002, U.S. Pat. No. 6,320,905, "Postprocessing system for removing blocking artifacts in block-based codecs," issued to Konstantinides on Nov. 20, 2001, U.S. Pat. No. 6,178,205, "Video postfiltering with motion-compensated temporal filtering and/or spatial-adaptive filtering," issued to Cheung et al. on Jan. 23, 2001, U.S. Pat. No. 6,167,157, "Method of reducing quantization noise generated during a decoding process of image data and device for decoding image data," issued to Sugahara et al. on Dec. 26, 2000, and U.S. Pat. No. 5,920,356, "Coding parameter adaptive transform artifact reduction process," issued to Gupta et al. on Jul. 6, 1999.

Discrete cosine transform (DCT) domain methods are described by Triantafyllidis, et al., "*Blocking artifact detection and reduction in compressed data*," IEEE Transactions on Circuits and Systems for Video Technology, Vol. 12, October 2002, and Chen, et al., "*Adaptive post-filtering of transform coefficients for the reduction of blocking artifacts*," IEEE Transactions on Circuits and Systems for Video Technology, Vol. 11, May 2001.

Wavelet-based filtering methods are described by Xiong, et al., "*A deblocking algorithm for JPEG compressed images using overcomplete wavelet representations*," IEEE Transactions on Circuits and Systems for Video Technology, Vol. 7, No. 2, August 1997, and Lang, et al., "*Noise reduction using an undecimated discrete wavelet transform*," Signal Processing Newsletters, Vol. 13, January 1996.

Iterative methods are described by Paek, et al., "*A DCT-based spatially adaptive post-processing technique to reduce the blocking artifacts in transform coded images*," IEEE Transactions on Circuits and Systems for Video Technology, Vol. 10, February 2000, and Paek, et al., "*On the POCS-based post-processing technique to reduce the blocking artifacts in transform coded images*," IEEE Transactions on Circuits and Systems for Video Technology, Vol. 8, June 1998.

Fuzzy rule-based filtering methods are described by Arakawa, "*Fuzzy rule-based signal processing and its application to image restoration*," IEEE Journal on selected areas in communications, Vol. 12, No. 9, December 1994, and U.S. Pat. No. 6,332,136, "Fuzzy filtering method and associated fuzzy filter," issued to Giura et al. on Dec. 18, 2001.

Most of the prior art methods deal only with blocking noise. Those methods are not effective for ringing noise. Some methods, such as the wavelet-based methods, can suppress ringing, but cause blurring in the decompressed entire image. The prior art of fuzzy rule-based filtering method deals only with white Gaussian noise.

The above prior art methods operate individually on pixels, and apply the same filter to each pixel. Those methods do not consider the underlying content of the image, as a whole. Therefore, those filters either smooth the image excessively to eliminate the artifacts, which causes blurring, or cannot reduce the artifacts sufficiently if minimal smoothing is applied.

Another problem of those methods is the computational complexity. For example, the wavelet-based method requires eight convolution-based low-pass and high-pass filtering operations to obtain the wavelet images. Then, the de-blocking operation is performed on these wavelet images to remove the blocking artifacts. To reconstruct the de-blocked image, twelve convolution-based low-pass and high-pass filtering operations are required. Thus, a total of twenty convolution-based filtering operations are required in that method. The computational cost cannot meet the requirements of real-time processing. Similar to the wavelet-based method, DCT-domain method also has high computational complexity. For low-pass filtering using a 5×5 window, twenty-five DCT operations are required for processing a single 8×8 block. Such high complexity is also impractical for real-time processing. The computational cost for the iterative method is even higher than that of the above two methods. As for the fuzzy rule-based filtering method, the iterative method requires a large number of filter parameters, and extra training data.

In view of the problems of the prior art methods, it is desired to provide a new filtering mechanism that achieves better image/video quality with a low computational complexity.

SUMMARY OF THE INVENTION

A method filters pixels in an image, by first partitioning the image into blocks. Edge block are identified. A variance of an intensity for each pixel in each edge block is determined.

Then, each pixel in each edge block is filtered with a filter that is dependant on the variance of the pixel.

DETAILED DESCRIPTION OF THE PREFERRED EMBODIMENT

Figure 1:
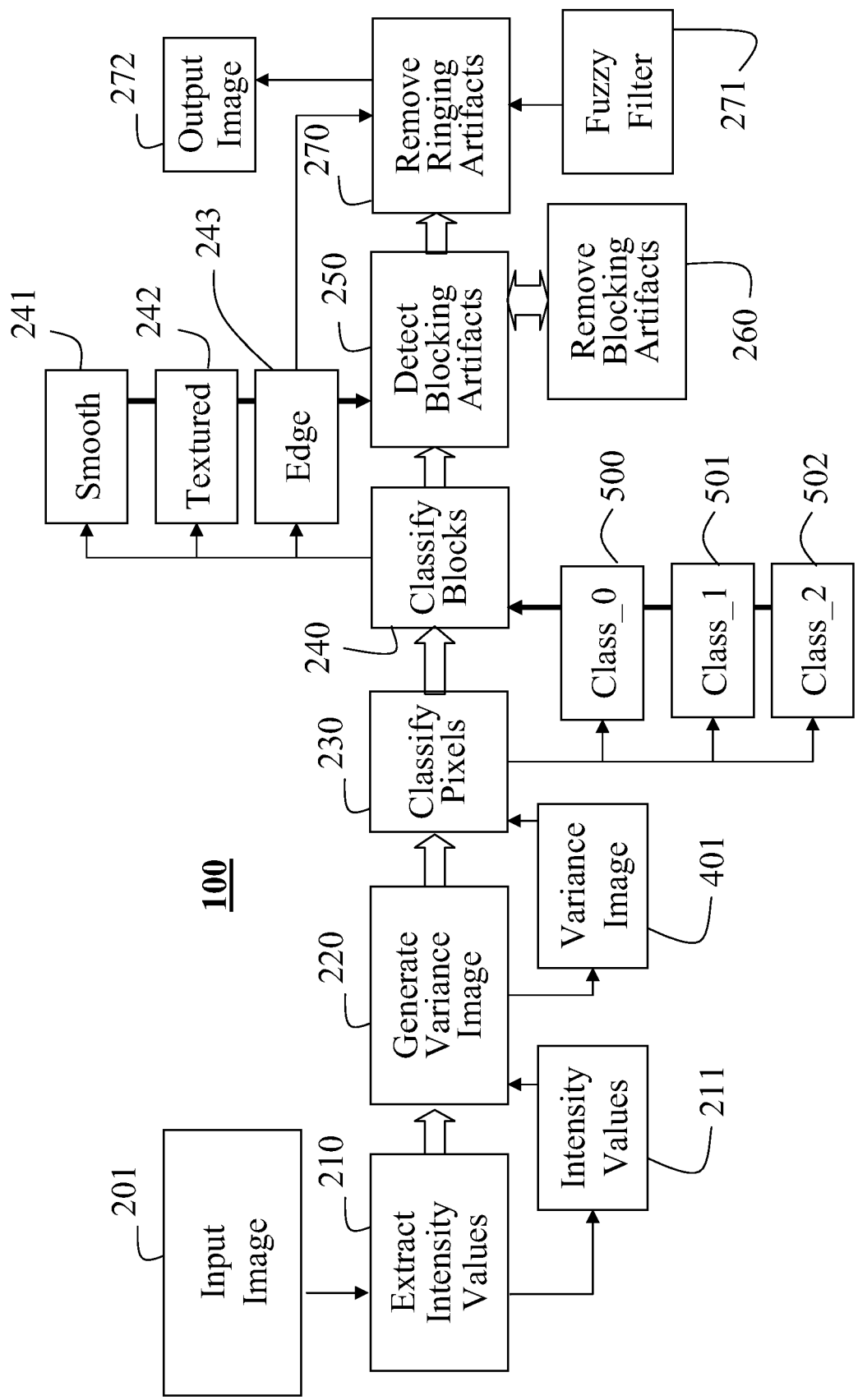
FIG. 1 is a block diagram of a method and system for removing artifacts from a decompressed image according to the invention.

FIG. 1 shows the system and method 100 according to the invention. This system is independent of any image or video decoder. The system does not rely on any coding parameters embedded in a compressed image or video. The emphasis of our method is on local features in an image. The method according to the invention extracts local features, which are classified. The classified features can then be used to filter selectively and adaptively the pixels, if the images is a decompressed image.

The input is an image 201. The method works for any image format, e.g., YUV or RGB. It should be understood that the system can handle a sequence of images as in a video. For example, the image 201 can be part of a progressive or interlaced video. It should also be noted that the input image can be source image that has never been compressed, or a decompressed image.

However, if the input image is a decompressed image derived from a compressed image, and the compressed image was derived from a source image compressed with a block-based compression process, then due to the prior compression, the decompressed image 201 has blocking artifacts caused by independent quantization of DCT coefficients blocks of the compressed image. Therefore, the decompressed image 201 has block discontinuities in spatial values between adjacent blocks. Ringing artifacts are also possible along edges in the decompressed image.

In order to reduce these artifacts while preserving the original source information, the filtering according to the invention is based on a classification of local features in the input image 201. Furthermore, the filtering is adaptive to the adaptive.

Variance Image

From a statistical perspective, a distribution of intensity values of the pixels reveals features of the decompressed image. A mean intensity value m of the image represents the DC component of the image. The mean intensity value can be measured by $$m = E\{x[i, j]\} = \sum_{i=0}^{M} \sum_{j=0}^{N} x_{i,j} p_{x_{i,j}}, \quad (1)$$

where M and N are a width and height of the decompressed image in terms of pixels, and $p_{x_j}$ is a probability of a pixel occurred at a location of i, j.

An average power of the decompressed image is a mean-square value $$\overline{m^2} = E\{x[i, j]^2\} = \sum_{i=0}^{M} \sum_{j=0}^{N} x_{i,j}^2 p_{x_{i,j}}. \quad (2)$$

A fluctuations about the mean is the variance $$\sigma^2 = E\{(x[i, j] - m)^2\} \quad (3)$$
$$= \sum_{i=0}^{M} \sum_{j=0}^{N} (x_{i,j} - m)^2 p_{x_{i,j}}$$
$$= \sum_{i=0}^{M} \sum_{j=0}^{N} x_{i,j}^2 p_{x_{i,j}} - m^2.$$

The mean-square represents an average power of DC component in the image, and the variance represents an average power of the AC frequency components in the compressed image 201. Therefore, the variance of the intensity values is used as a measure of a fluctuation AC power, which represents the energy in the image.

If the variance is high for a pixel, than the pixel is likely to be associated with an edge. If the variance is low, the pixel is part of a homogeneous region of the image, for example, a smooth background. Thus, the variance reveals characteristics of local features in the image.

Because both the blocking artifacts and the ringing artifacts are due to the local characteristics of features, i.e., the artifacts appear either on block boundaries or near the edges, the local features are sufficient to reveal these artifacts. Therefore, the classification and filtering according to the invention are based on the energy distribution as measured by the local variance of pixel intensity values, as stated in Equation (3) above. The feature characteristics are determined by extracting 210 intensity values 211 as follows.

Figure 3:
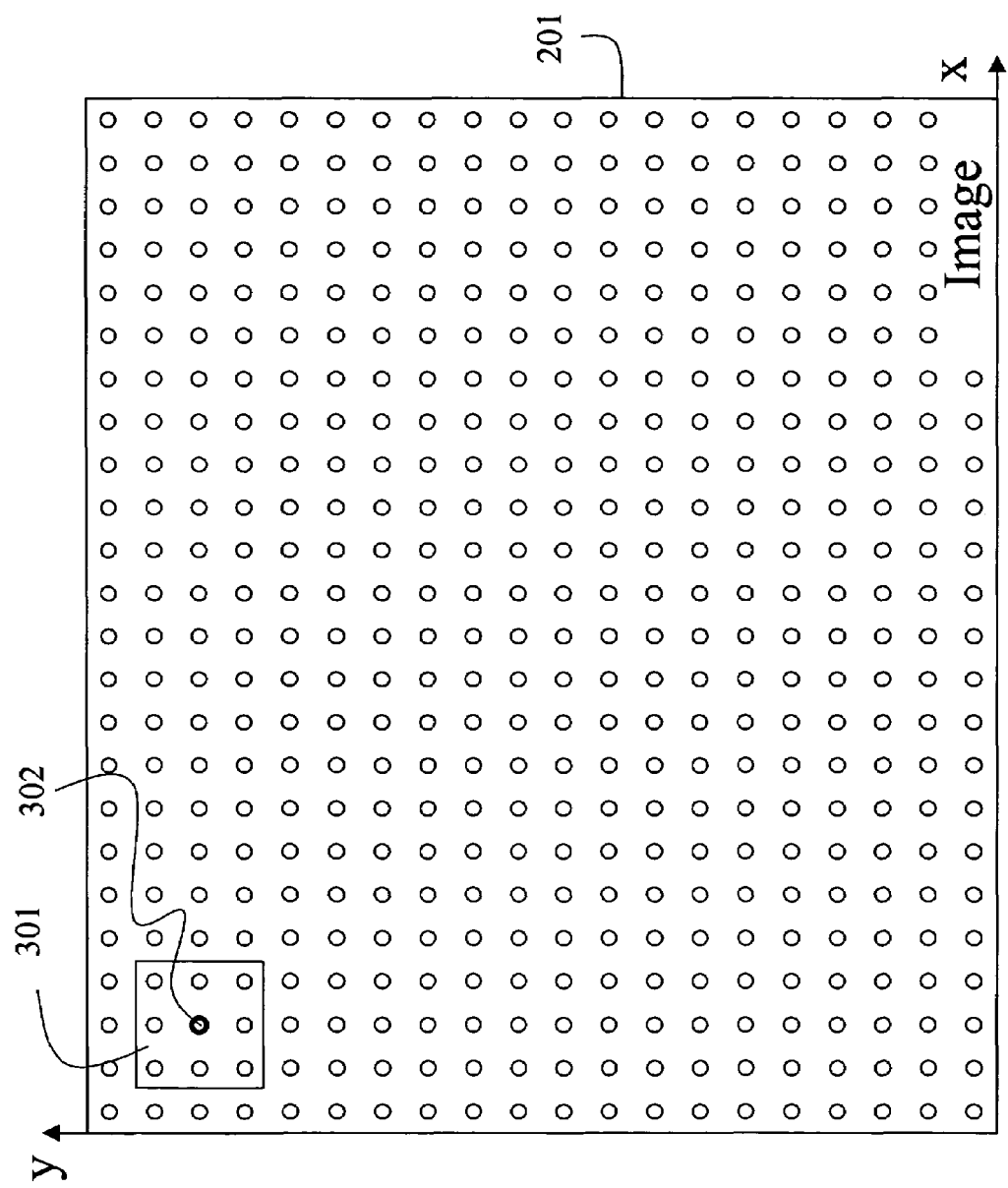
FIG. 3 is a block diagram of feature extraction according to the invention.

As shown in FIG. 3, a smooth 3×3 filter 301 is scanned over each pixel 302 in a decompressed image 201. The scanning can be in raster scan order. The mean and the variance of the intensities values 211 are determined 220 for each central pixel 301 of the filter according to equations 1-3. The variance values form a variance image 401. From geometry viewpoint, the local variance reflects a gradient of the decompressed image at each pixel location. Because the gradient is very high at edges in the image.

Figure 4:
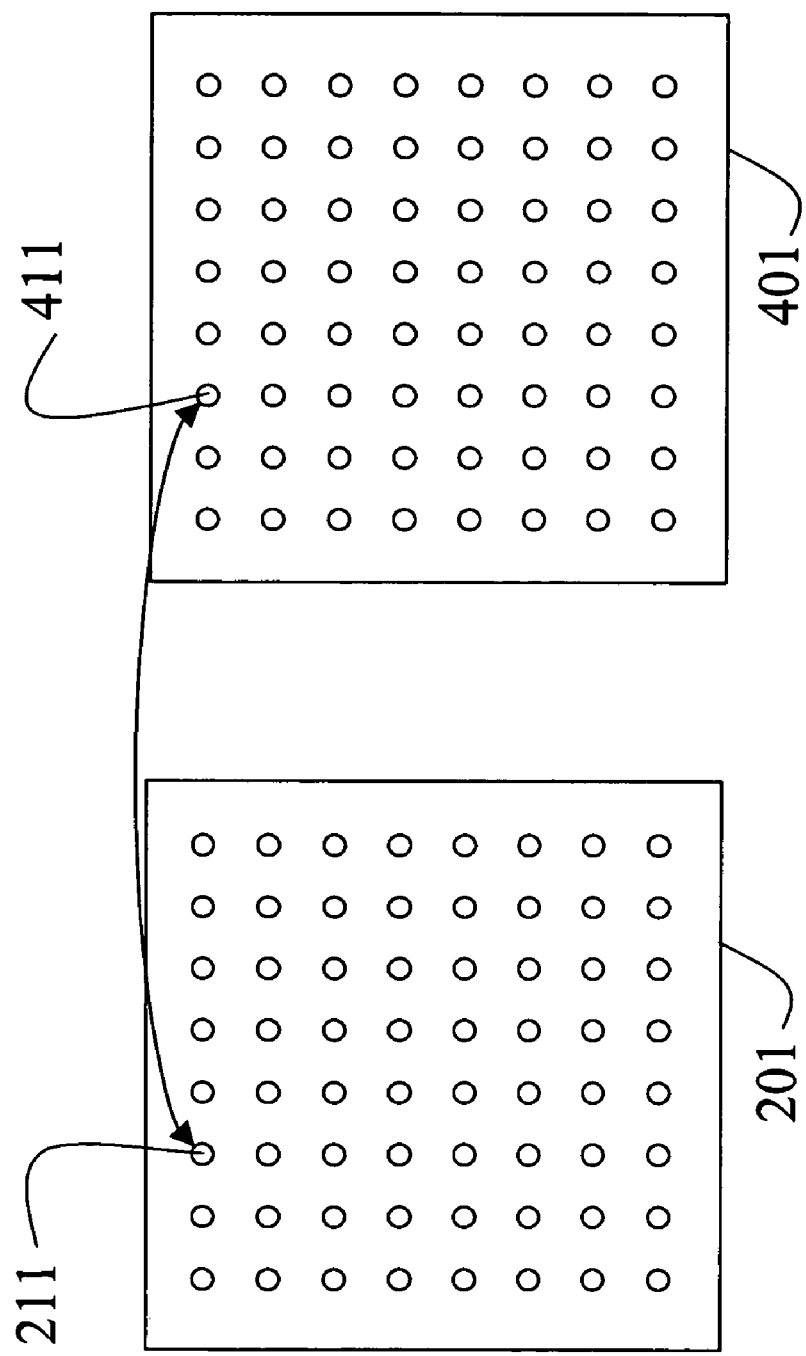
FIG. 4 is a block diagram of mapping between an intensity image and a variance according to the invention.

As shown in FIG. 4, the feature extraction and scanning transforms the decompressed image 201 from the spatial domain where the pixels have intensity values 211 to the variance image 401 in the energy domain where the pixels having variances 411.

Pixel Classification

Figure 5:
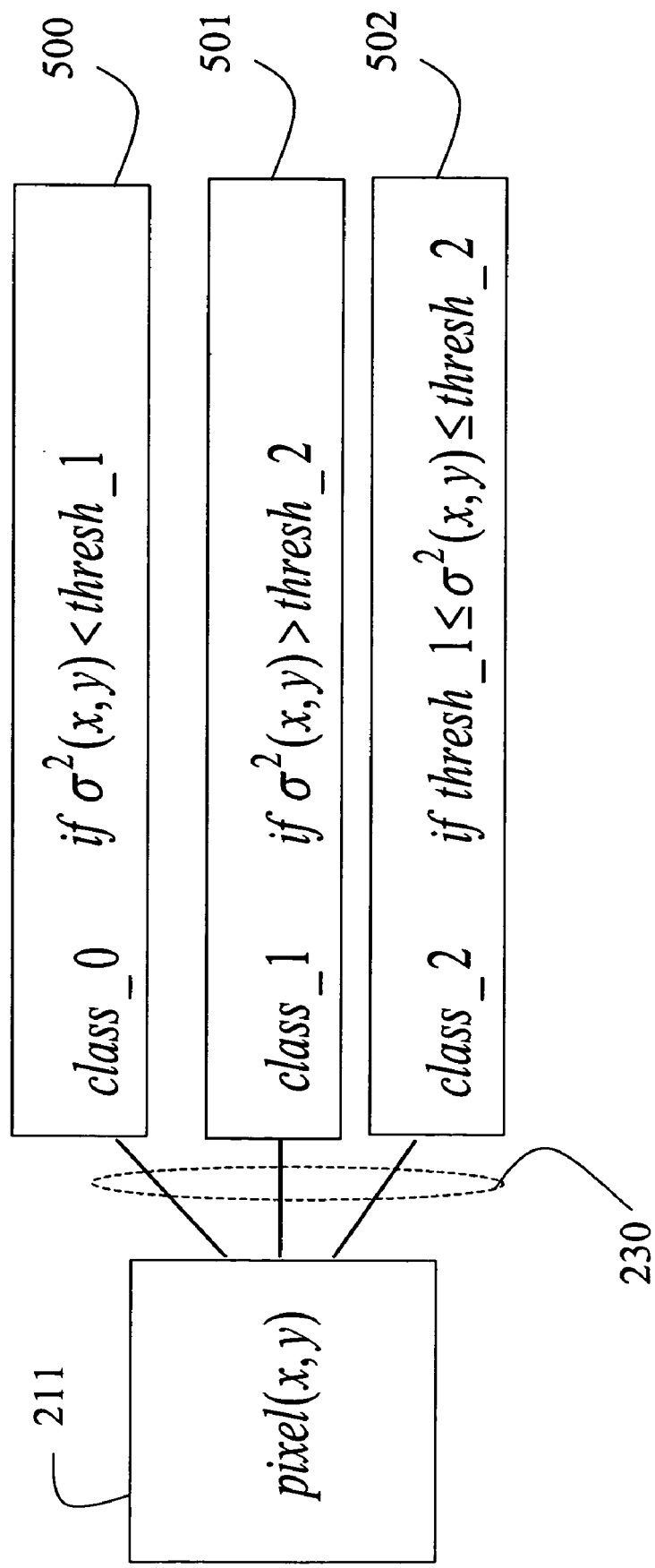
FIG. 5 is a block diagram for classifying pixels according to the invention.

As shown in FIG. 5, pixels 211 with variances less than a first threshold_1 are classified 230 as class_0 500. These pixels correspond to homogeneous or 'smooth' regions in the image. Pixels with variances greater than a second threshold_2 are classified as class_1 501. These pixels most likely correspond to edges. Pixels with variances between these two thresholds are classified as class_2 502. These pixels can be considered as either ringing noise or texture depending on the characteristics of neighboring pixels. The adaptive filtering according to the invention is performed according to the above classifications.

Block Classification

Blocks of pixels are also classified 240 in into 'smooth' 241, 'textured' 242 and 'edge' 243 blocks according to the variance values in the variance image 401. The block classification 240 can be based on the total variance within each block or by counting the number of pixels of each class in the block. For example, if all the pixels in the block are class_0, then the block is classified as smooth. If at least one pixel in the block is class_1 then the block is classified as an edge block. Otherwise, if the block has both class_0 and class_2 pixels, then the block is classified as a texture block.

Blocking Artifact Detection

Most recognized standards for compressing images and videos use are based on DCT coding of blocks of pixels. Block-base coding fully partitions the image into blocks of pixels, typically 8×8 pixels per block. The pixels of each block are transformed independently to DCT coefficients. Then, the DCT coefficients are quantized according to a predetermined quantization matrix. Due to the independent coding, the blocking artifacts are visible at the block boundaries.

Figure 6:
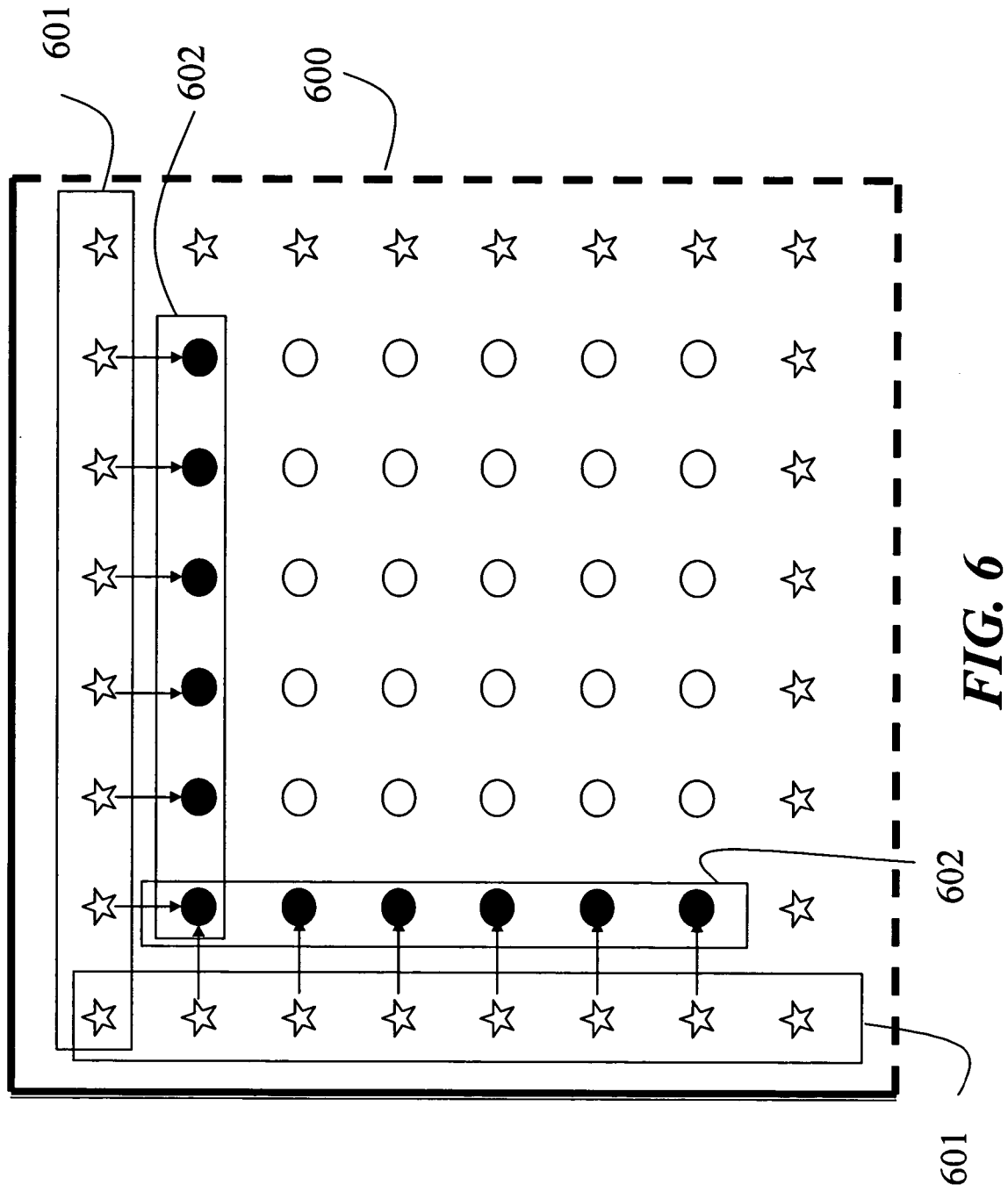
FIG. 6 is a block diagram for detecting blocking artifacts according to the invention.

FIG. 6 shows how blocking artifacts are detected 250 on an 8×8 block 600. Outer pixels are denoted by stars 601, and 'inner' pixels by black circles 602. The inner pixels are located adjacent and parallel to the top row and left column in the block. The detection 250 is performed from left to right and top to bottom for each block.

The gradients of the variances of the outer pixels 601 are most like the inner pixels 602 when blocking artifacts exist. The criterion for deciding that blocking artifact are present is $$|\sum_{i=1}^{6} \text{sign}(*_i - \bullet_i)| \geq 5 \tag{4}$$

sign is either +1 or −1. The above test distinguishes between blocking artifacts and edges on block boundaries.

Deblocking Filter

Figure 7:
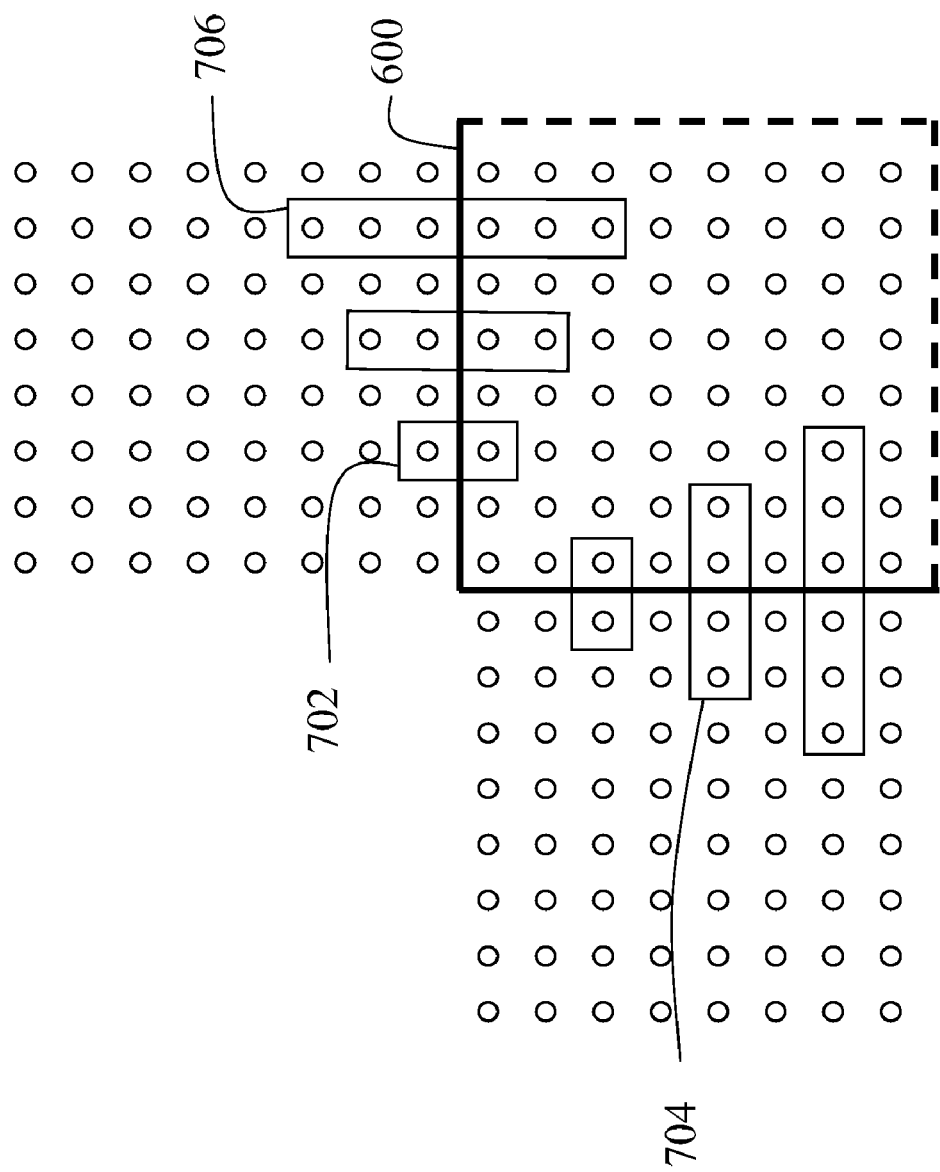
FIG. 7 is a block diagram for filtering blocking artifacts according to the invention.

As shown in FIG. 7, the blocking artifacts are removed 260 by filtering detected block boundaries in the decompressed image. If a blocking artifact is detected, a one-dimensional low-pass (smoothing) filter is adaptively applied to pixels along block boundaries 600. Sizes of the filters 702, 704, 706, e.g., two, four, six or more pixels, correspond to the gradients at the block boundaries. Pixels with large gradient values, i.e., edge pixels, are excluded from the filtering operation to avoid blurring edges or textures.

Fuzzy Filter

The deringing 270 operates only on edge blocks 243 by applying a fuzzy filter 271. The fuzzy filter according to the invention is based on fuzzy transformation theory, see Nie et al., "*Fuzzy transformation and its applications*," IEEE International Conference on Image Processing, Barcelona, Spain, September, 2003.

In a fuzzy transformation, a relationship between spatial sample $x_i$, e.g., a pixel intensity value, and an order statistic $x_j$ is established by a real-valued Gaussian function $\mu_F(a, b)$, where i is a spatial index i=1, 2, ..., N, j=1, 2, ..., N is an order statistic, $x_{(1)} \leq x_{(2)} \leq ... \leq x_{(N)}$, and a size of an observation or filtering window is N.

The member ship function has the following constraints:

$\lim_{|a-b| \to 0} \mu_F(a,b) = 1$;

$\lim_{|a-b| \to \infty} \mu_F(a,b) = 0$; and $|a_1 - b_1| \leq |a_2 - b_2| \Rightarrow \mu_F(a_1, b_1) \geq \mu_F(a_2, b_2)$ This yields a N×N fuzzy spatial-rank (SR) matrix, which is defined by $$\tilde{R} = \begin{bmatrix} \tilde{R}_{1,(1)} & \cdots & \tilde{R}_{1,(N)} \\ \vdots & \ddots & \vdots \\ \tilde{R}_{N,(1)} & \cdots & \tilde{R}_{N,(N)} \end{bmatrix} \tag{5}$$

where $R_{i,(j)} = \mu_F(x_i, x_{(j)}) \in [0,1]$, i, j=1, 2, ... N.

Because elements of the fuzzy SR matrix R are dependent on a difference of values between each pair of pixels, the fuzzy SR matrix contains spread information embedded in the observed pixels.

The original or 'crisp' spatial pixel can be 'transformed into fuzzy spatial pixels by multiplying a crisp order statistics vector with a row normalized fuzzy SR matrix. The resulting fuzzy spatial pixels also reflect the spread information. The output 272 of the fuzzy filter 271 according to the invention is the fuzzy counterpart of a center pixel in the observation or filtering window.

The filter output can be obtained using the following simplified formula $$y = \tilde{x}_c \tag{6}$$

$$= \frac{\sum_{j=1}^{N} x_{(j)} \mu_F(x_c, x_{(j)})}{\sum_{j=1}^{N} \mu_F(x_c, x_{(j)})}$$

$$= \frac{\sum_{j=1}^{N} x_j \mu_F(x_c, x_j)}{\sum_{j=1}^{N} \mu_F(x_c, x_j)}$$

$$= \frac{x_c + \sum_{j=1, j \neq c}^{N} x_j \mu_G(x_c, x_j)}{1 + \sum_{j=1, j \neq c}^{N} \mu_G(x_c, x_j)},$$

where $x_c$ and $\tilde{x}_c$ are the crisp and fuzzy center pixel, respectively.

As implied by the final expression of the filter output, an ordering operation is unnecessary. Thus, the computational complexity of the fuzzy filter 271 is only slightly higher than that of the linear filter. The only extra computation is for evaluating the function values between N-1 pairs of pixels. Note that $\mu_F(x_c, x_c)=1$ for all pixels, and thus need not to be determined.

In one embodiment of the invention, the real-valued function $\mu_g(a, b)$ is defined by a Gaussian function $e^{-(a-b)^2/2\xi^2}$, where a spread parameter $\xi$ is twenty.

Figure 2:
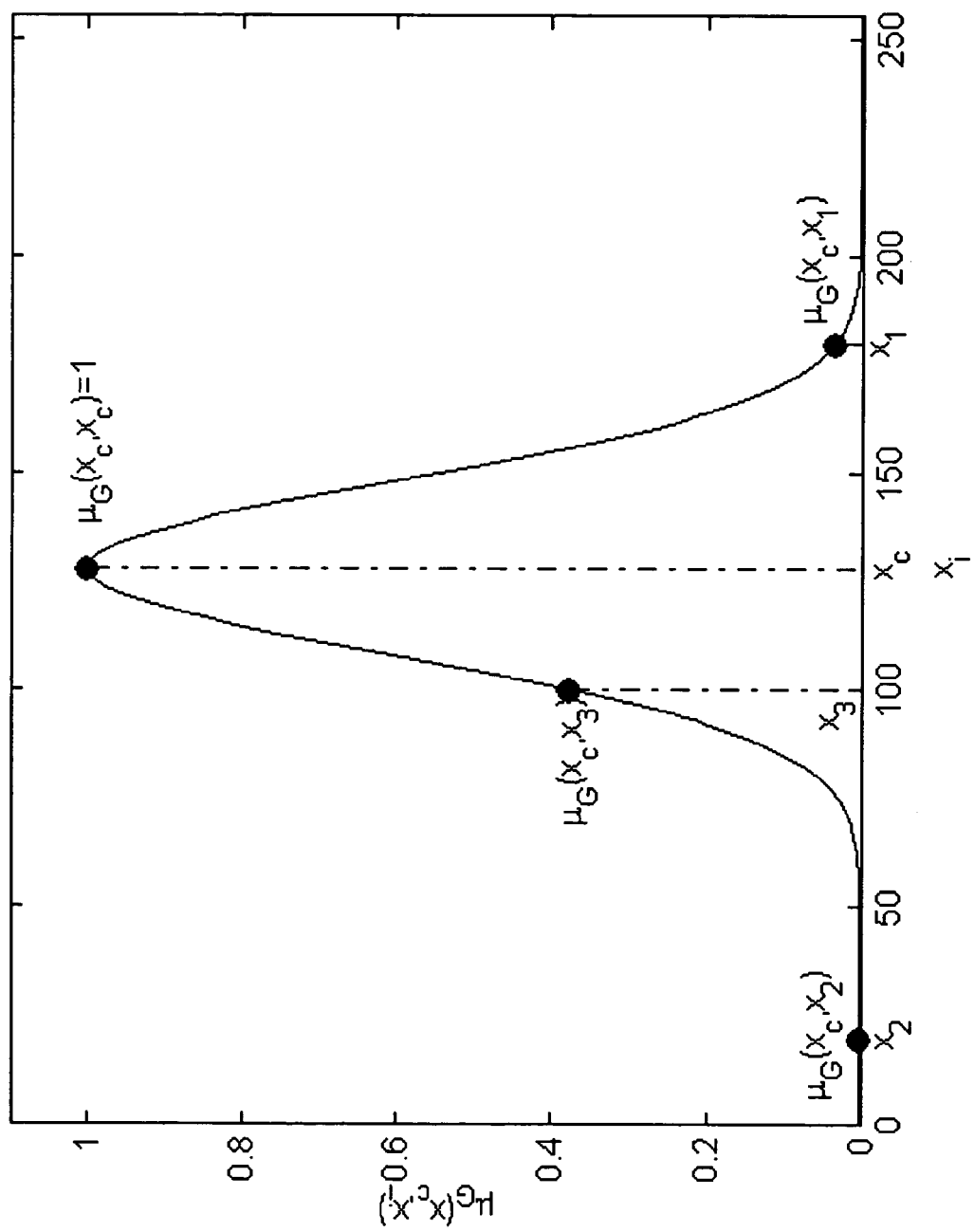
FIG. 2 is a graph of a Gaussian function for evaluating pixel value affinities and generating fuzzy filter parameters according to the invention.

FIG. 2 shows some example values of the Gaussian function, which represents the value affinity between a sample $x_i$ (i=1, 2, ..., N) and the window center sample $X_C$. In the given example, $x_C=128$, $x_1=180$, $x_2=20$, $x_3=100$.

From the above expression, we can see that the fuzzy filter output is a weighted average of the samples in the filtering window. The Gaussian function value, i.e., the affinity measure of each sample to the center sample, including the center sample itself, is used as the weight of the corresponding sample.

Thus, the closer the sample value is to the center sample, the larger weight is assigned to the sample. This leads to the effect that the similarly valued samples are further clustered around their local mean, while disparately valued samples are substantially the same. This is known as the clustering property of the fuzzy transformation.

As the result, the fuzzy filter 271 according to the invention has a data-adaptive smoothing feature, and thus can perfectly preserve strong-edges, while removing weak-edges associated with annoying ringing artifacts.

Figure 8:
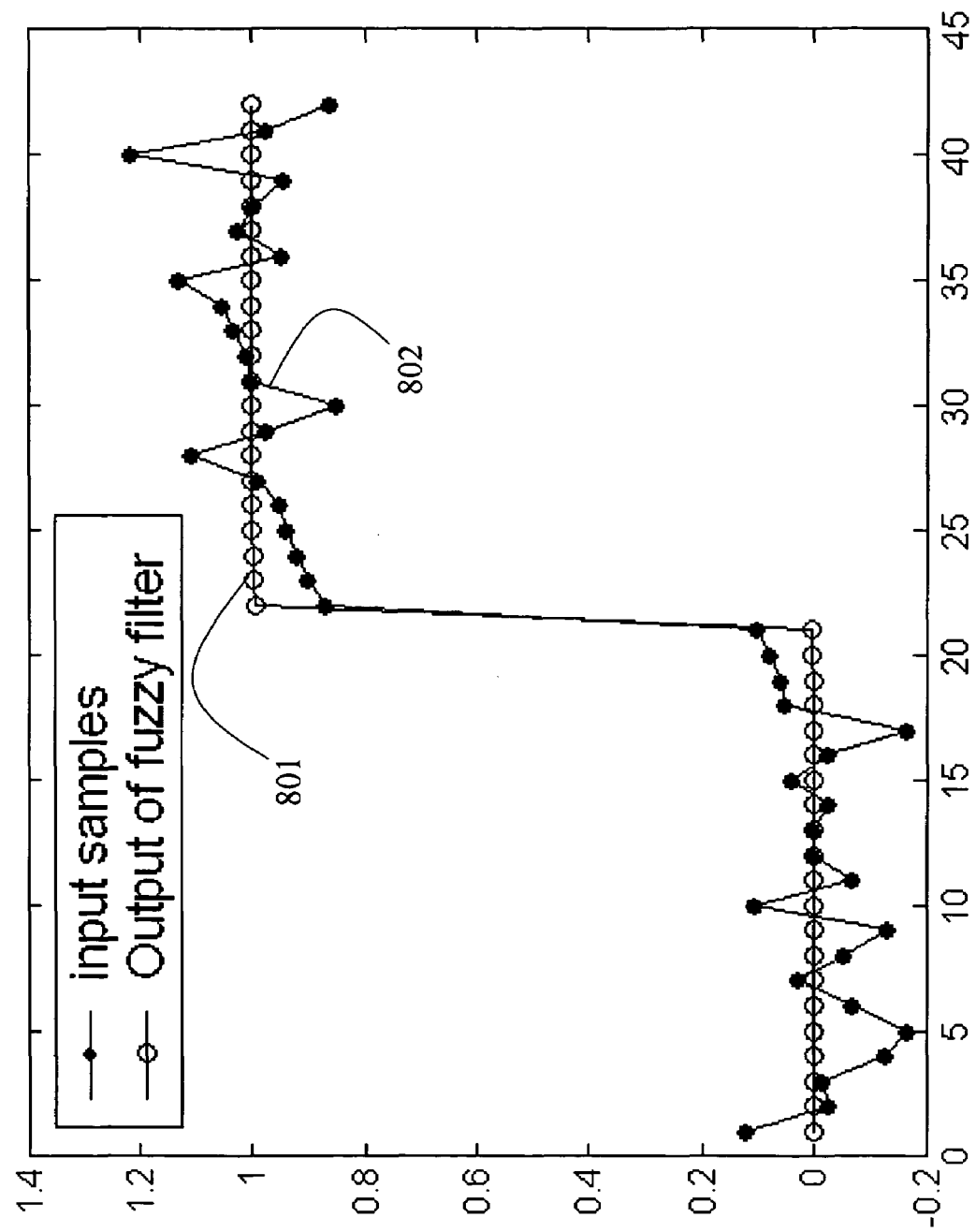
FIG. 8 is a graph showing data-adaptive smoothing property of a fuzzy filter according to the invention.

FIG. 8 shows this feature. In this example, input samples of 'step' signal 801 are corrupted by uniformly distributed noise. The corrupted signal is thus constituted by two groups of crisp samples, one group is localized around zero, and the other ground around one.

After filtering by the fuzzy filter 271, each group including similarly valued samples, is more tightly clustered around a local mean of the group, resulting in a filtered step signal 802. Thus, the undesirable perturbations in the uniform regions are smoothed, while the step edge is restored. Note that this example exactly simulates the ringing artifacts around a strong-edge. Therefore, the example demonstrates how the fuzzy filter removes these artifacts and preserves the edge as well.

Adaptive Filtering

It can be seen from the above formula (6) that the fuzzy center pixel in the window is a weighted average. Each weight is given by the Gaussian function, particularly as defined by the spread parameter $\xi$. The spread parameter controls the shape of the Gaussian function, i.e., the coverage of the filtering. If the spread parameter $\xi$ is large, then the Gaussian function is relatively wider. This corresponds to a smoother filter. If the spread parameters$\xi$ is small, then the Gaussian function is narrow, and the smoothness of the filtering is decreased. The window size N has a similar characteristic. A large window has a stronger smoothing effect than a small window.

Therefore, we provide an adaptive fuzzy filtering method. The window size N and the spread parameter $\xi$ are determined adaptively according to the values in the variance image 401.

There are four possible combinations of window size N and spread parameter $\xi$:
small window N and small $\xi$;
small window N and large $\xi$;
large window N and small $\xi$; and
large window N and large $\xi$.

Our basic rule is that that a small variance corresponds to a small window and a small spread parameter $\xi$, and a large variance corresponds to a large window and large spread parameter $\xi$.

Figure 9:
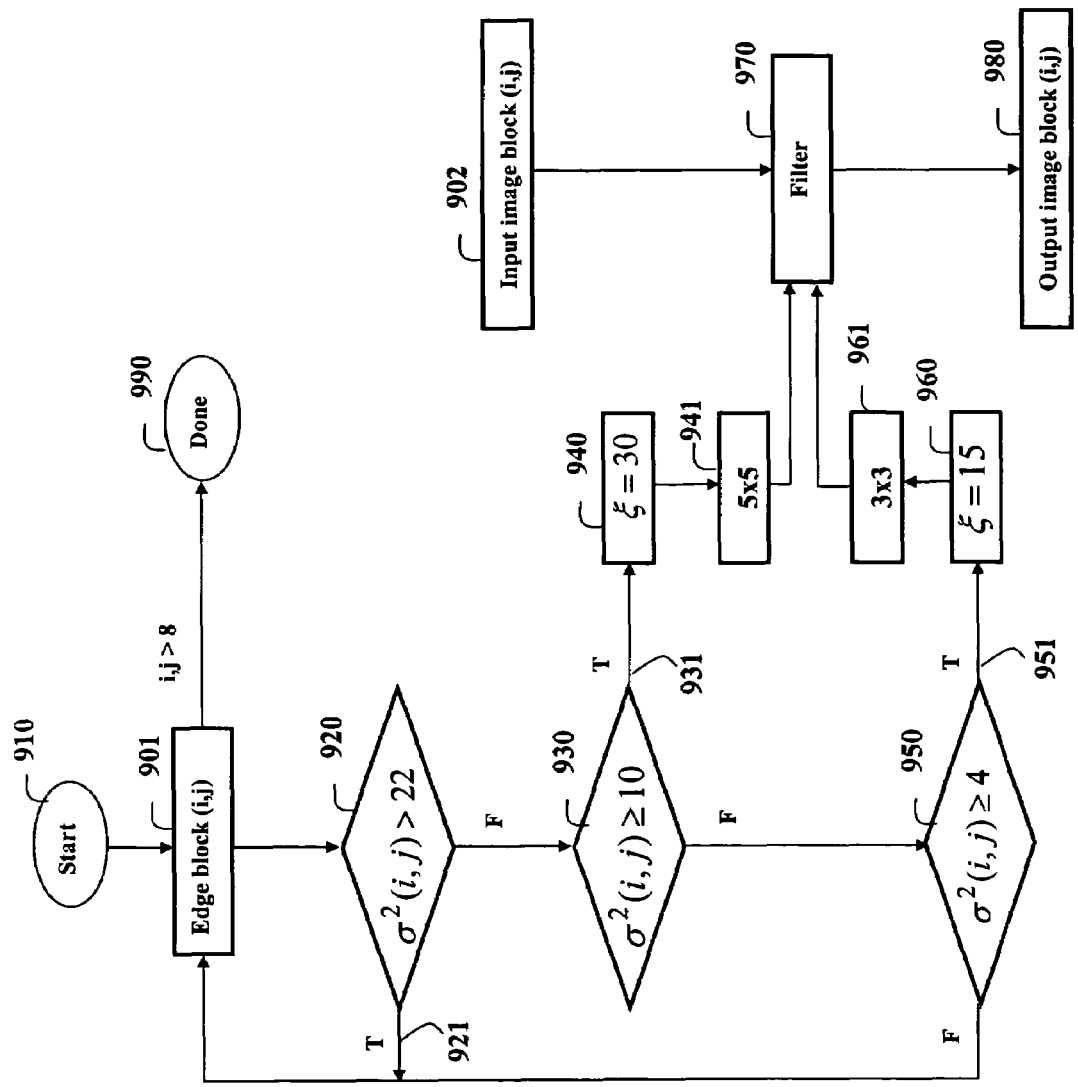
FIG. 9 is a block diagram of adaptive filtering according to the invention.

FIG. 9 shows the steps of the adaptation method according to the invention. At the start 910, the inputs to the method are a next classified block 901, until done 990, and a corresponding decompressed image block 902.

In step 920, we determine whether a variance value in the variance image 401 is greater than twenty-two. If true 921, then it highly likely that the corresponding image pixel is probably on an edge. Therefore, to retain the sharpness of the edge, this pixel is all-pass filtered. In the basic fuzzy filtering, as described above, every edge pixel is filtered by the same filter having the same spread parameter.

Otherwise, if false, step 930 determines if the variance value is less than twenty-two and greater than or equal to ten. If true 931, then the image pixel is probably corrupted by ringing noise and we select a large spread parameter 940, $\xi$ is thirty 30, and a large window size 941, N is 5×5, i.e., a strong smooth fuzzy filter, is used for the filtering 970 to reduce maximally the ringing artifacts.

Otherwise, if false, step 950 determines if the variance is less than or equal to ten and greater than or equal to four. If true 951, then the corresponding image pixel is in a 'weak' edge area, or may be corrupted slightly by the ringing noise. In this case, a small spread parameter 960, $\xi$ is fifteen, and a small window 961, N is 3×3, i.e., a weak smooth fuzzy filter, is used for the filtering 970. Otherwise, if the variance is less than four, the image pixel is in a smooth region, and all-pass filtering is applied, and the next pixel is processed. After all pixels are processed, the filtered block is output 980, and the next block 901 is processed until done 990.

It should be noted, that various limit values for the variance, window, and spread parameter, e.g., (22, 10, 4), (5, 3), and (30, 15) can be changed for different applications and still be within the spirit and scope of the invention.

Improved Deblocking

In a conventional interlaced video, a single frame can be coded jointly with frame-based and field-based coding scheme. This increases the complexity of the artifacts. To achieve better artifacts removal and better detail preservation, the two fields of each video frame are processed separately by our invention. Vertical and horizontal deblocking are performed using different schemes. A 1-D adaptive fuzzy filter with different window size is applied to remove the horizontal and vertical blocking artifacts, respectively.

Detecting Vertical Blocking Artifacts

Figure 10:
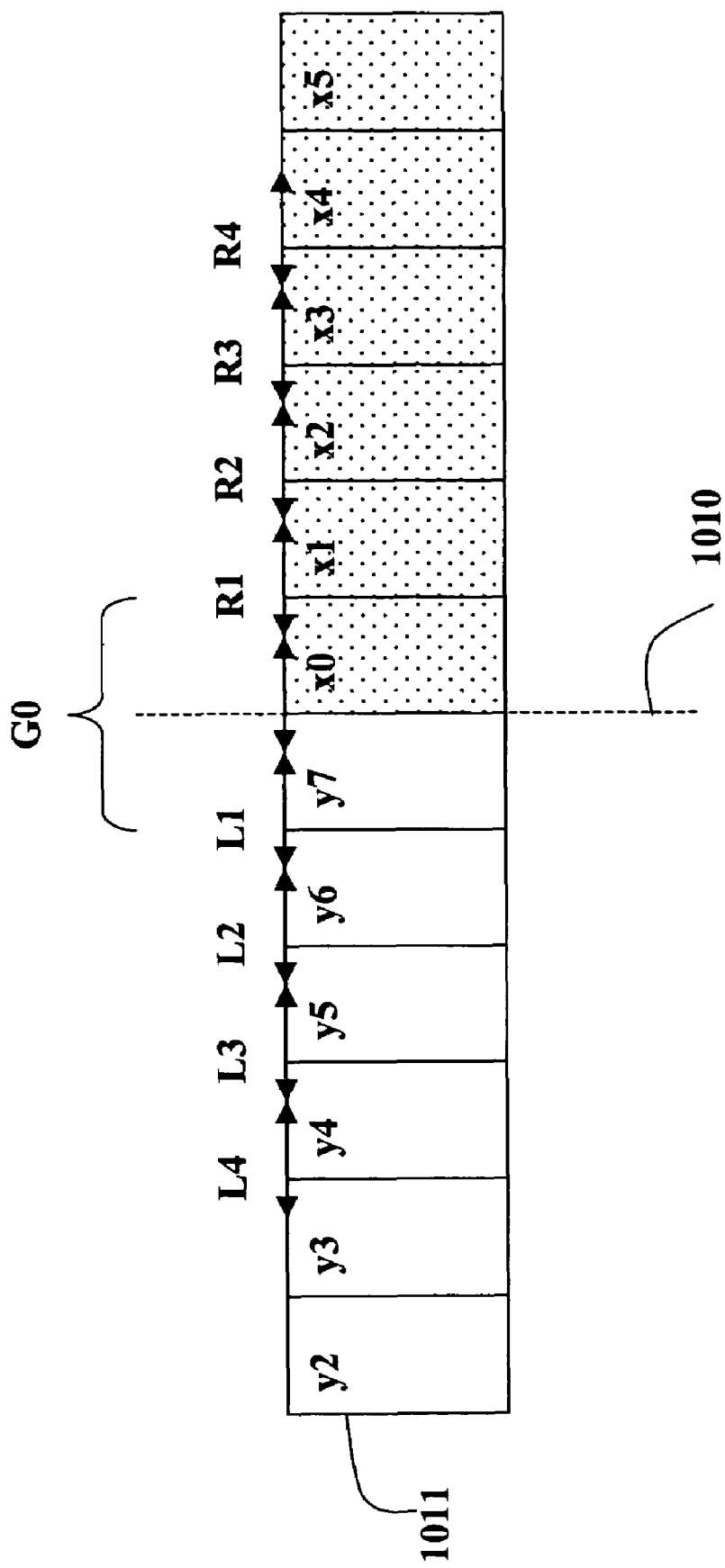
FIG. 10 is a block diagram of vertical blocking artifacts detection.

As shown in FIG. 10, vertical blocking artifacts detection is performed along each vertical block boundary 1010 of an 8×8 row of pixels 1011 crossing the boundary. A difference in pixel intensities, G0, is determined by G0=|x0−y7|. Then, a difference between the intensity of each pair of adjacent pixels on the left and right-hand side of the block boundary are also determined, as denoted by L1, L2, L3, L4 and R1, R2, R3, R4, respectively. If max(L1, L2, L3, L4)<G0, or max(R1, R2, R3, R4)<G0, then the row is marked, and a boundary gap is detected along the row.

After checking all eight pairs of boundary pixels in the row 1011 along the vertical boundary 1010 of the block, if the number of the marked rows (or boundary gaps) is greater than a predetermined threshold TH 1, e.g. TH 1=0, a blocking artifact is detected at the current block vertical boundary, and 1-D adaptive fuzzy filtering is performed across this boundary to remove vertical blocking artifacts, otherwise filtering is skipped.

Removing Vertical Blocking Artifact

Figure 11:
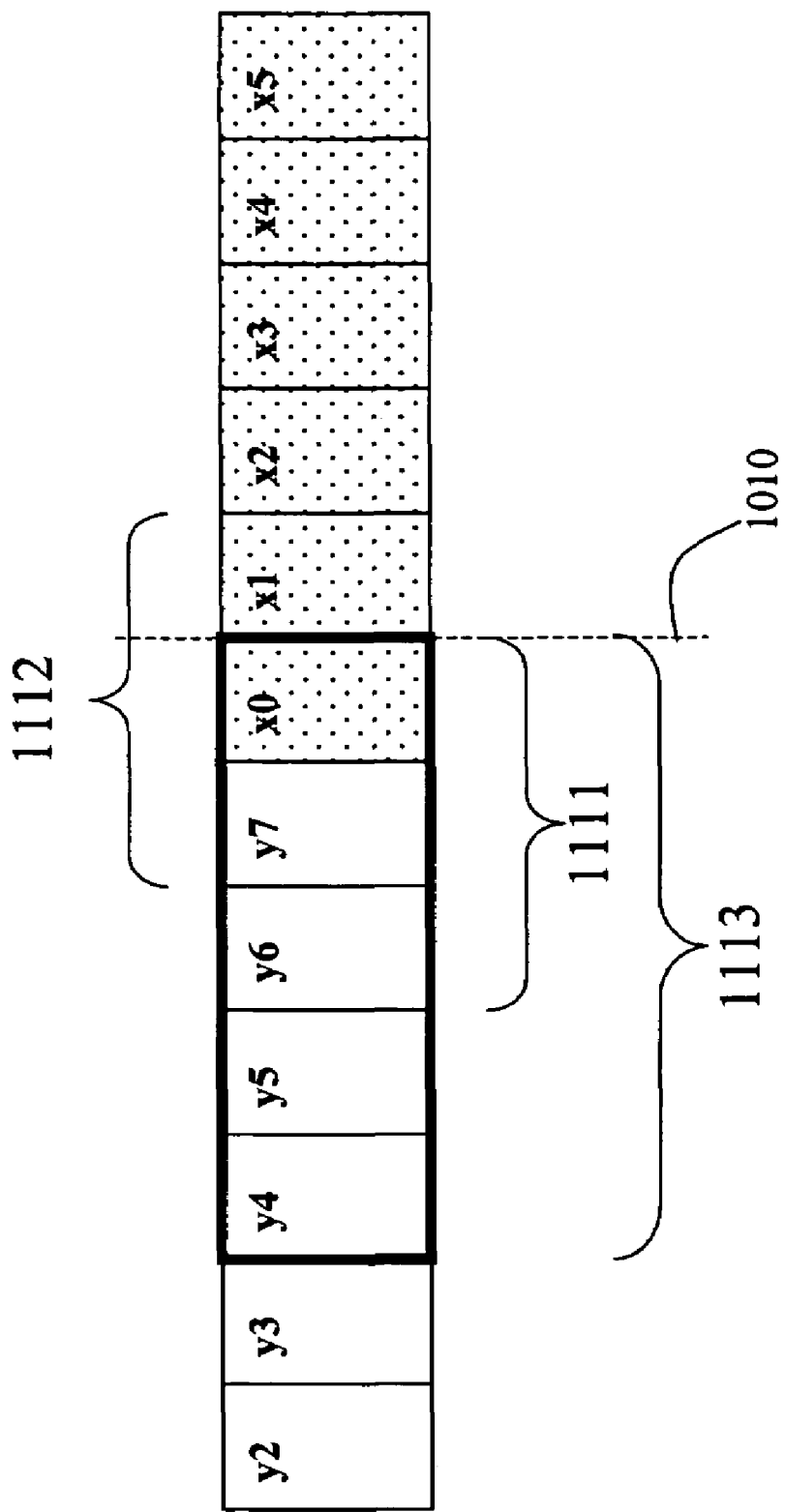
FIG. 11 is a block diagram of vertical blocking artifacts removal.

As shown in FIG. 11, the 1-D filtering is performed only in the marked row cross the block boundary. If
MAX(L1, L2, L3, L4)<G0, which means the boundary gap is evident compared with the differences between the adjacent pixels at the left-hand side, then the pixels 1111, y6, y7 and x0, are filtered. Similarly, if
MAX(R1, R2, R3, R4)<G0, then the pixels 1112, y7, x0 and x1, are filtered.

Note that when the difference of intestates between a pair of adjacent pixels on one side of the boundary is greater than the boundary gap, which is very likely caused by an edge in the input image, a boundary gap is probably not present, and filtering is not necessary on this side of the row. This also helps preserve edges in the image, while still filtering blocking artifacts that appear as edges.

1-D Fuzzy Filter

The filter used for smoothing the vertical blocking artifact is a five-tap fuzzy filter 1113 centered at each pixel to be filtered, e.g., y6. The fuzzy filter preserves strong-edges that lie along the block boundary.

The output of the fuzzy filter is:

$$y = \frac{\sum_{j=1}^{N} \hat{w}_j x_j}{\sum_{j=1}^{N} \hat{w}_j},$$

where $\hat{w}_j = \mu_L(|x_j - x_c|)$, $x_c$ is the center pixel in the filter window, and $\mu_L(\cdot)$ is a piece-wise linear function defined as follows $$\mu_L(x) = \begin{cases} 32, & 0 \le x \le 12 \\ -x \cdot 2/3 + 40, & 12 < x < 60, \\ 0, & x \ge 60 \end{cases}$$

Detecting Horizontal Blocking Artifacts

Figure 12:
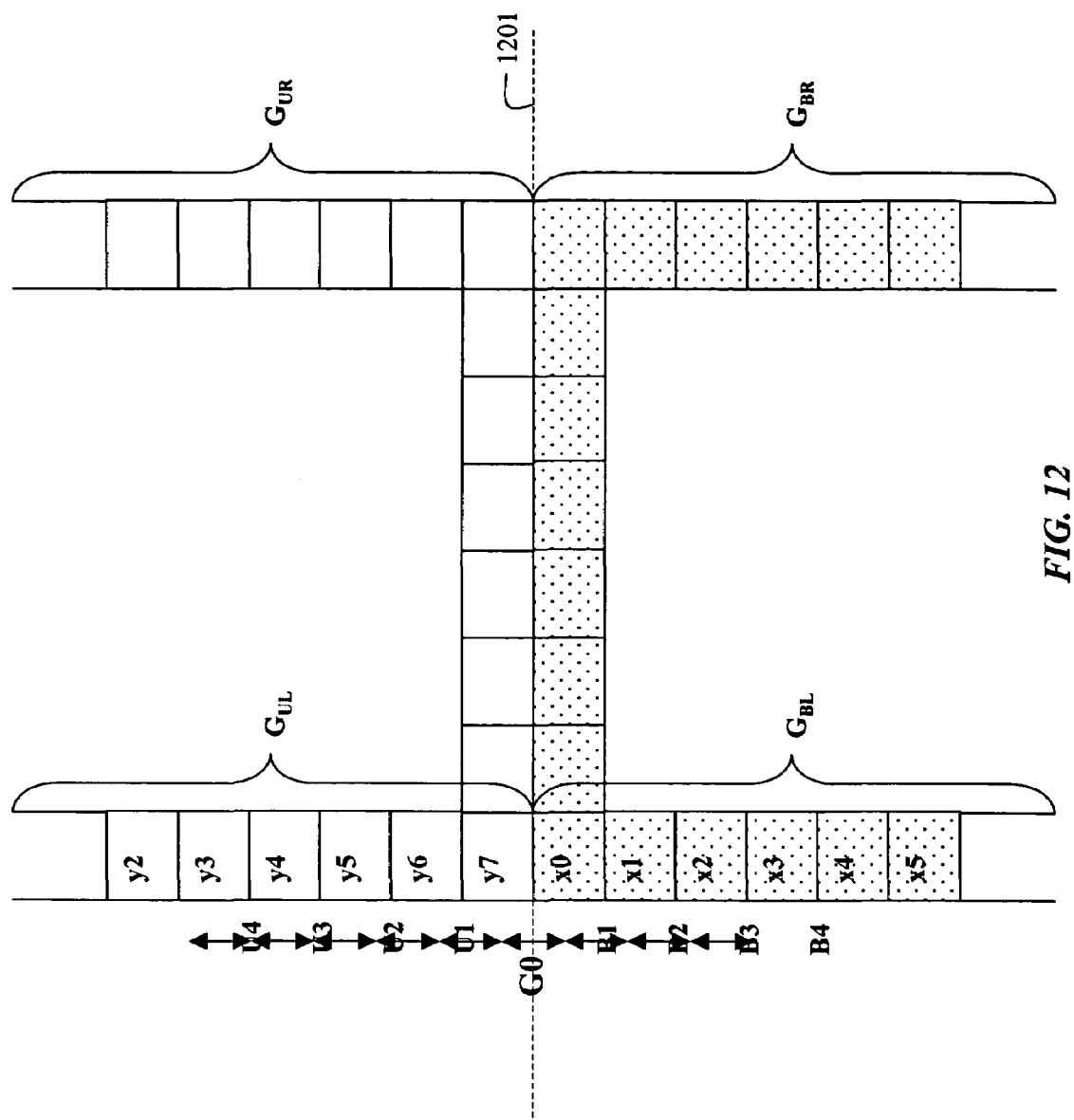
FIG. 12 is a block diagram of horizontal blocking artifacts detection.

FIG. 12 shows how horizontal blocking artifact are detected in a column of pixels crossing a horizontal block boundary 1201. G0 is a difference between image intensities of a pair of boundary pixels, i.e., G0=|x0−y7|, and U1, U2, U3, U4 and B 1, B2, B3, B4 are the intensity differences between each pair of adjacent pixels in the upper side and bottom side of the horizontal boundary. $G_{UL}$, $G_{UR}$, $G_{BL}$ and $G_{BR}$ are the number of vertical boundary gaps at adjacent upper-left, upper-right, bottom-left and bottom-right vertical boundaries, respectively.

The horizontal blocking artifact detection is performed along each horizontal boundary of an 8×8 block. The method is similar to that used for detecting the vertical blocking artifact, but additional conditions need to be satisfied before a horizontal blocking artifact is identified. The reason for adding these conditions is to detect the blocking artifact more precisely and avoid filtering across horizontal edges in the image that may exist along the block boundary. Filtering these real edges would result in annoying artifacts.

First, the horizontal boundary gaps are detected and counted using the same method for detecting and counting the vertical boundary gaps. However, now all operations are performed in each column across the current horizontal boundary. If the number of the horizontal boundary gaps detected along the current horizontal boundary is less than a predetermined threshold TH2, e.g., TH2=5, filtering is not be performed across this boundary. Otherwise, the four vertical block boundaries adjacent to the current horizontal boundary, i.e., the upper-left, upper-right, bottom-left and bottom-right, are checked to see whether severe vertical blocking artifacts occur around the current horizontal boundary.

Let $G_{UL}$, $G_{UR}$, $G_{BL}$, $G_{BR}$ denote the number of boundary gaps detected at the upper-left, upper-right, bottom-left and bottom-right vertical boundary, respectively. If at least one of the following conditions is satisfied, then we presume that horizontal blocking artifact occurs at the current horizontal boundary, because severe vertical blocking artifacts are also detected.

Conditions ($G_{UL}$>TH2) and ($G_{UR}$>TH2)

($G_{UL}$>TH2) and ($G_{UR}$>TH2)

($G_{UL}$>7) or ($G_{UR}$>7) or ($G_{BL}$>7) or ($G_{BR}$>7)

Because the vertical boundaries are processed before the horizontal boundaries, the number of the vertical boundary gaps at each vertical boundary is already known.

Removing Horizontal Blocking Artifact

Figure 13:
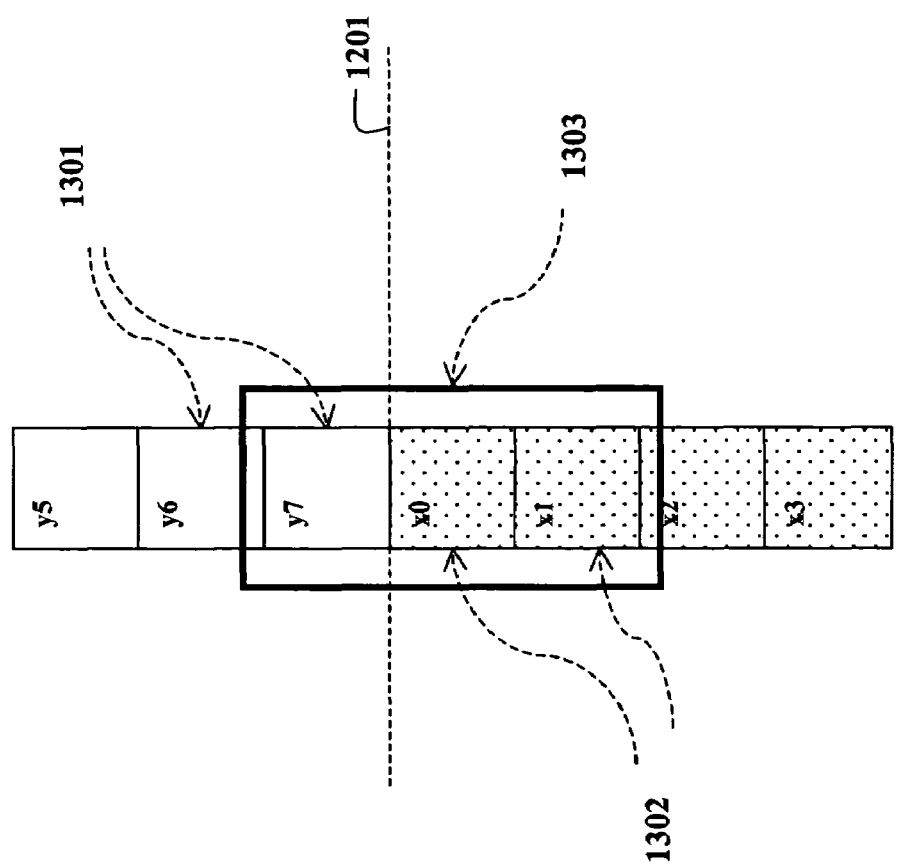
FIG. 13 is a block diagram of horizontal blocking artifacts removal.

As shown in FIG. 13, the 1-D filtering is performed only in the marked column across the horizontal block boundary. When MAX(U1, U2, U3, U4)<G0, which means the boundary gap is evident compared with the differences between the adjacent pixels at the upper side, the pixels 1301, y6, y7, are filtered.

Similarly, if MAX(B1, B2, B3, B4)<G0, then the pixels 1302, x0, x1, are filtered. Note that only one boundary pixel (x0 or y7) is filtered for each side, which is different from filtering across the vertical boundary, where both x0 and y7 are filtered for either side. This reduces the filtering across the horizontal edges. The filter used for smoothing the horizontal blocking artifact is the three-tap fuzzy filter 1303 centered at each pixel to be filtered. The filter weights are decided using equation (7).

Block Classification

As described above, block classification can significantly reduce local artifacts without reducing the overall quality of the image. However, there are a number of other imaging applications that can also benefit from block classification. For example, if blocks are appropriately classified a higher overall compression rates can be achieved by applying different compression rates and techniques to different blocks. For example, higher compression rates and simpler compression techniques can be applied to smooth blocks, so that additional bandwidth and more sophisticated compression can be applied to blocks with more complex textures. Similarly, the efficiency of pattern recognition and object tracking can be improved by first discarding 'uninteresting' blocks. In addition, the classified blocks can be used selectively by an image retrieval system accelerate content searching and browsing.

Therefore, the invention provides the following block classification technique.

Figure 14:
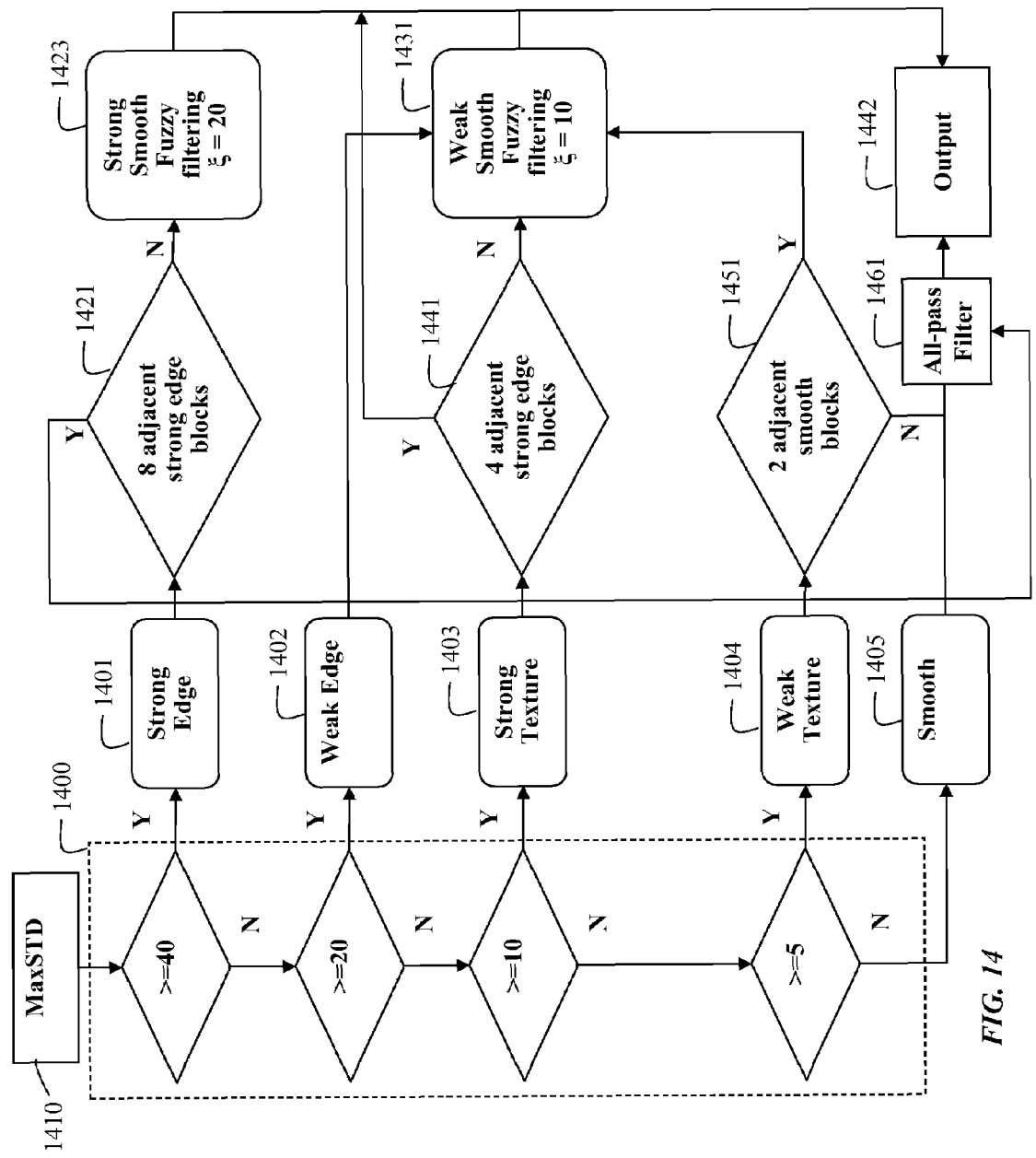
FIG. 14 is a block diagram of pixel classification and filtering according to the invention.

FIG. 14 shows another method for classifying pixels in blocks according to the invention. The image 201 is divided into non-overlapping 8×8 blocks as described above. The variance of each pixel is determined, as described above, in the variance image 401. Then, the pixel with the maximum variance or standard deviation is used determine the classification of the block (variance $=\sigma^2$ and STD=$\sqrt{\text{variance}}$).

Each block is classified into one of the five categories: strong-edge 1401, weak-edge 1402, strong-texture 1403, weak-texture 1404, and smooth 1405 according to MaxSTD 1410 ranges 1400.

$$\text{MaxSTD} \begin{cases} \in [40, +\infty) & \Rightarrow StrongEdge \\ \in [20, 40) & \Rightarrow WeakEdge \\ \in [10, 20) & \Rightarrow StrongTexture \\ \in [5, 10) & \Rightarrow WeakTexture \\ \in [0, 5) & \Rightarrow Smooth \end{cases}$$

Block Filtering

For a progressive video, the filtering is performed for each block in each frame, and for an interlaced video, the filtering is performed on the blocks in each field. The filter for each block is selected according to the classification of the block and the classification of adjacent blocks, as shown in FIG. 14. Furthermore, the filtering is adaptive in that the spread parameter of the filter is proportional to the maximum variance or maximum standard deviation, i.e., a larger maximum standard deviation results in a larger spread parameter.

Strong-edge Block 1401: If the eight neighboring blocks 1421 (top, bottom, left, right, top-left, top-right, bottom-left, bottom-right) are all strong-edge blocks, perform all-pass filtering 1461 and output 1442 the block, otherwise each pixel is filtered 1423 by an adaptive fuzzy filter, with a spread parameter $\xi$ is twenty, that is strong smooth fuzzy filtering, and output the block.

Weak-edge Block 1402: Each pixel is filtered 1431 by the adaptive fuzzy filter with the spread parameter $\xi$ set to ten, which is a weak smooth fuzzy filtering, and output the block.

Strong-texture Block 1403: If the four adjacent blocks 1441 (top, bottom, left, right) are all strong-edge blocks, all-pass filter and output. Otherwise, each pixel is filtered 1431 by the fuzzy filter with the spread parameter $\xi$ set to ten.

Weak-texture Bock 1404: If at least two of the four adjacent blocks 1451 (top, bottom, left, right) are smooth block, each pixel is filtered 1431 by the adaptive fuzzy filter with the spread parameter $\xi$ set to ten.

Smooth Block 1405: If the block is a smooth block then apply the all-pass filter 1461, and output 1442 the block.

Figure 15B:
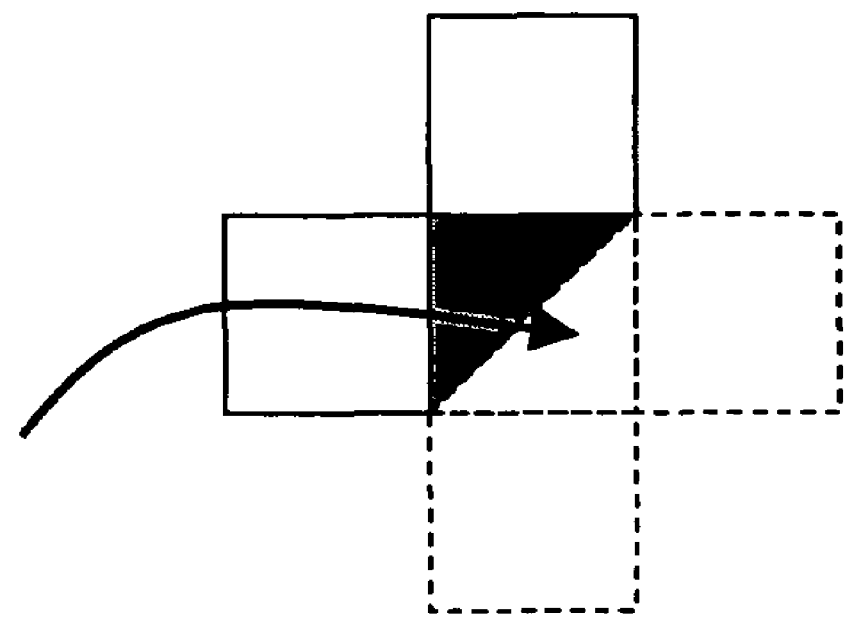
FIG. 15B is a block diagram of an edge block surrounded by at least two smooth blocks.
Figure 15A:
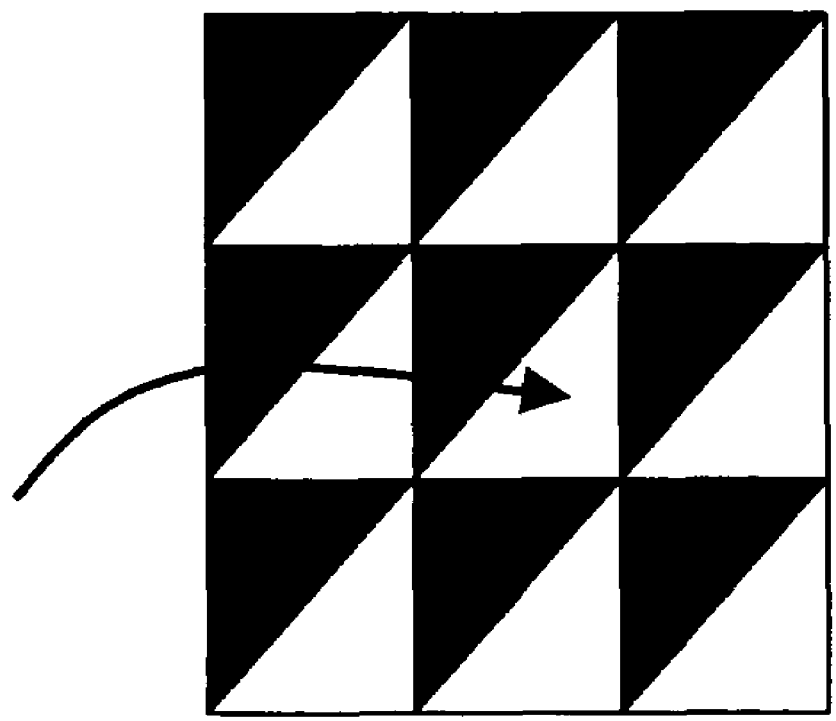
FIG. 15A is a block diagram of an edge block surrounded by eight adjacent edge blocks.

As shown in FIG. 15A, filtering of a strong-edge block 1501 can skipped when the block is completely surrounded by other strong-edge blocks. This is because ringing artifacts do not appear prominent in a large region of strong-edges due to masking effects. Secondly, because minor artifacts only appear prominent in a smooth region, a weak-edge block 1502 only needs to be filtered when there are adjacent smooth blocks. Filtering in the texture blocks can be optional, and can be selected depending on the compression rate. If the compression ratio is high, e.g., the quantizer scale parameter is greater than forty, then is more likely that ringing artifacts appear in decompressed texture blocks. Therefore, a weak smooth fuzzy filtering should be applied.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for filtering pixels in an image, comprising:
   partitioning a plurality of pixels in an input image into a plurality of blocks;
   identifying edge blocks in the plurality of blocks;
   determining a variance of an intensity for each pixel in each edge block; and
   filtering each pixel in each edge block with a filter that is dependent on the variance of the intensity of the pixel, in which the filter is a Gaussian function $e^{-(a-b)^2/2\xi^2}$ having a spread parameter $\xi$, and a window of size N, and a small variance corresponds to a small window and a small spread parameter $\xi$, and a large variance corresponds to a large window and large spread parameter $\xi$, and in which the filtering further comprises:
   setting the spread parameter $\xi$ to fifteen and the window N to three if the variance is in a range of four to ten;
   setting the spread parameter $\xi$ to thirty and the window N to five if the variance is in a range of ten to twenty-two; and
   setting the filter to an all-pass filter otherwise.

2. The method of claim 1, further comprising:
   identifying a row of pixels crossing a vertical boundary between two adjacent blocks;
   determining a difference in intensities of the pixels to the left and right of the vertical boundary to detect a boundary gap; and
   filtering the pixels in the row only if the boundary gap is detected.

3. The method of claim 2, in which the filtering uses a one-dimensional fuzzy filter centered at each pixel in the row to be filtered.

4. The method of claim 1, further comprising:
   identifying a column of pixels crossing a horizontal boundary between two adjacent blocks;
   determining a difference in intensities of the pixels above and below the horizontal boundary to detect a boundary gap; and
   filtering the pixels in the column only if the boundary gap is detected.

5. The method of claim 4, in which the filtering uses a one-dimensional fuzzy filter centered at each pixel in the column to be filtered.

* * * * *